USO08123620B2

United States Patent
Rabin et al.

(10) Patent No.: US 8,123,620 B2
(45) Date of Patent: Feb. 28, 2012

(54) ENHANCED VIDEO GAME JUKEBOX-TYPE SYSTEM AND METHODOLOGY

(75) Inventors: Steve Rabin, Bothell, WA (US); Kelly Lindseth, Seattle, WA (US)

(73) Assignee: Nintendo Co., Ltd., Kyoto (JP)

( * ) Notice: Subject to any disclaimer, the term of this patent is extended or adjusted under 35 U.S.C. 154(b) by 574 days.

(21) Appl. No.: 12/342,615

(22) Filed: Dec. 23, 2008

(65) Prior Publication Data

US 2010/0160048 A1 Jun. 24, 2010

(51) Int. Cl.
*A63F 9/24* (2006.01)
*A63F 13/00* (2006.01)
*G06F 17/00* (2006.01)
*G06F 19/00* (2011.01)

(52) U.S. Cl. .............................. 463/43; 463/29; 463/44

(58) Field of Classification Search .................... 463/29, 463/43, 44
See application file for complete search history.

(56) References Cited

U.S. PATENT DOCUMENTS

| 5,581,270 | A | 12/1996 | Smith et al. |
| 5,923,306 | A | 7/1999 | Smith et al. |
| 5,935,004 | A | 8/1999 | Tarr et al. |
| 5,959,596 | A | 9/1999 | McCarten et al. |
| 6,147,696 | A | 11/2000 | Smith et al. |
| 6,154,186 | A | 11/2000 | Smith et al. |
| 6,599,194 | B1 | 7/2003 | Smith et al. |
| 6,687,184 | B2 * | 2/2004 | Johnson et al. ............ 365/233.1 |
| 2002/0128068 | A1 | 9/2002 | Whitten et al. |
| 2007/0275780 | A1 | 11/2007 | Sloate et al. |

FOREIGN PATENT DOCUMENTS

JP 2001-58087 3/2001

OTHER PUBLICATIONS

Game Genie, Wikipedia, Aug. 23, 2003, 4 pages, http://en.widipedia.org/wiki/Game_Genie.

* cited by examiner

*Primary Examiner* — Fernando L Toledo
(74) *Attorney, Agent, or Firm* — Nixon & Vanderhye P.C.

(57) ABSTRACT

A multiple game jukebox system includes a hard drive that is able to execute video game software designed for execution on a conventional home-based system. The hard drive embodies various partitions including multiple partitions, where each partition represents a video game DVD disk. In communicating with such a hard disk drive device using the existing DVD bus, a particular pattern of disk reads or seeks is utilized to cause the hard drive to serve alternative data on subsequent disk reads (other than what exists on the currently selected disk). A media serving device initially defaults to playing a disk that contains a game selection menu program. The menu permits a user to select one of multiple video games for play.

26 Claims, 5 Drawing Sheets

ENHANCED VIDEO GAME JUKEBOX-TYPE SYSTEM AND METHODOLOGY

FIELD OF THE INVENTION

The invention generally relates to video game systems and methodologies for playing multiple video games. More particularly, the illustrative implementations relate to a video game system that enables users to select for play any one of multiple video games (that are typically stored on individual removable media) using a uniquely generated game selection menu. Such multiple video games are uniquely accessed from a large capacity mass memory media to create an improved video game jukebox-type system.

BACKGROUND AND SUMMARY

Video game systems permitting a user to select, for example, the ability to play five to over twenty video games are highly advantageous in particular environments and applications. A typical home-based video game system, such as Nintendo's popular Wii™ video game console and video game system, involves game play where a user physically places a removeable media, e.g., a single DVD disk, into a DVD disk drive to initiate game play. Typically, if a user desires to play a second game, the first disk must be removed and a second game program disk is loaded in the DVD disk drive.

In an environment, such as a hospital, a patient desiring to play a video game may physically be unable to move with sufficient dexterity to handle multiple DVD disks for playing multiple games. Additionally, in hotel environments, it is not desirable to provide multiple physical DVDs to users.

In accordance with an illustrative embodiment, a patient in a hospital utilizes a wireless remote control to both control game play and to select one of, for example, twenty video games to play without having to be concerned with handling physical DVD disks. The popular Wii™ video game system features a Wii remote controller that advantageously permits a patient to control game play in part through appropriate arm and body motion manipulation of the Wii remote to both enjoy game play and benefit from the rehabilitative exercise afforded by operating the controller. Additionally, an illustrative embodiment may be advantageously utilized in hotel and shopping center environments in which providing users with individual DVD disks is impractical and/or otherwise disadvantageous.

In a hotel context, in an illustrative embodiment, the multiple game playing device described herein includes a network interface permitting internet connection where users may be verified as valid system users. The internet additionally provides a convenient mechanism for downloading games into a high capacity, hard drive media used to store the, for example, twenty plus video games which may be selected for game play by a user.

An illustrative implementation additionally provides a mechanism for internal corporate game developers to send, for example, a video game near completion from one corporate branch to another to securely preview one or more new video games.

In a retail store or shopping mall context, a user wishing to preview multiple video games for purchase may advantageously utilize an illustrative embodiment to sample video game play to determine whether to later purchase a selected video game. Such an approach permits a user to sample a video game without having to handle a single DVD disk.

An illustrative embodiment includes a multiple game display menu that is dynamically updated to permit a constantly changing number of game titles to be selected by a user. In accordance with an illustrative embodiment, the menu generating software queries certain locations on the hard drive to determine what games are presently stored on the hard drive and accesses graphics permitting the user to preview, in some fashion, the game to be selected.

Although prior video game jukebox type systems are known, the illustrative implementations described herein provide enhanced system functionality and a unique, cost efficient, design.

In accordance with an illustrative embodiment, the game playing media, e.g., a DVD disk drive, of a conventional home-based video game system, such as Nintendo's Wii™ video game system, is replaced with an alternative media serving device (for example, a hard drive coupled with associated special purpose logic) in order to convert an existing video game system into a jukebox (adding the ability to play 1 of 20+ games as if it was running off of a single DVD disk). The modified multiple game jukebox system including the hard drive is able to execute video game software designed for execution on the Wii home-based system. The hard drive includes multiple partitions, certain of which correspond to individual Wii video game DVD disks.

In an illustrative implementation, the video game system communicates with such a hard disk drive device using the existing DVD bus, via a particular pattern of disk reads or seeks that are utilized to cause the hard drive to serve alternative data on subsequent disk reads (other than what exists on the currently selected disk).

In an illustrative implementation, a media serving device initially defaults to playing a disk that contains a game selection menu program. The menu permits a user to select one of multiple video games for play, while displaying the game rating to help ensure that the selected game is user appropriate. The game selection menu program dynamically determines how many games are stored on the media serving device. The game selection program generates signals via a particular pattern of disk reads or seeks causing the media serving device to then serve special directory information on the next legitimate read (instead of whatever exists on the currently selected menu disk). This directory information lists the number of games and their corresponding slots on the media serving device In addition, the illustrative implementation generates game preview graphics for a user to recognize games for selection. For example, in one of many possible implementations, the menu may access unique bitmap art and other related information about each selectable game. This information is held within the media serving device or virtual "disk" of each game and is not accessible through normal reads of the menu disk. The menu program asks the media serving device for this information via a particular pattern of disk reads or seeks. Then on subsequent disk reads, this information is served to the menu (instead of whatever exists on the currently selected menu disk).

In an illustrative implementation, once the menu generating program has the list of games and the information related to each game, it can present the user with a menu of the selectable games. For example, the user may then select a video game, such as Super Mario Galaxy or Wii Sports. Once a game is selected from the menu, the menu program communicates with the media serving device via a particular pattern of disk reads or seeks as to which video game disk should now be active in the disk drive from the perspective of the video game console. The menu then resets the video game system and the console boots up with the newly selected disk to play. When the device is reset again, it reverts to the menu disk and boots it again in order to repeat the process.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION OF THE INVENTION

A video game jukebox system is described herein together with a method for providing an existing video game system with an alternative media serving device, such as a hard drive and associated logic, to the single DVD disk drive conventionally used with an existing home-based video game system. Using the system and method described herein, the existing video game system may be efficiently converted into a device having the ability to play, for example, at least twenty games as if they each were stored on, for example, a single DVD disk.

Figure 1:
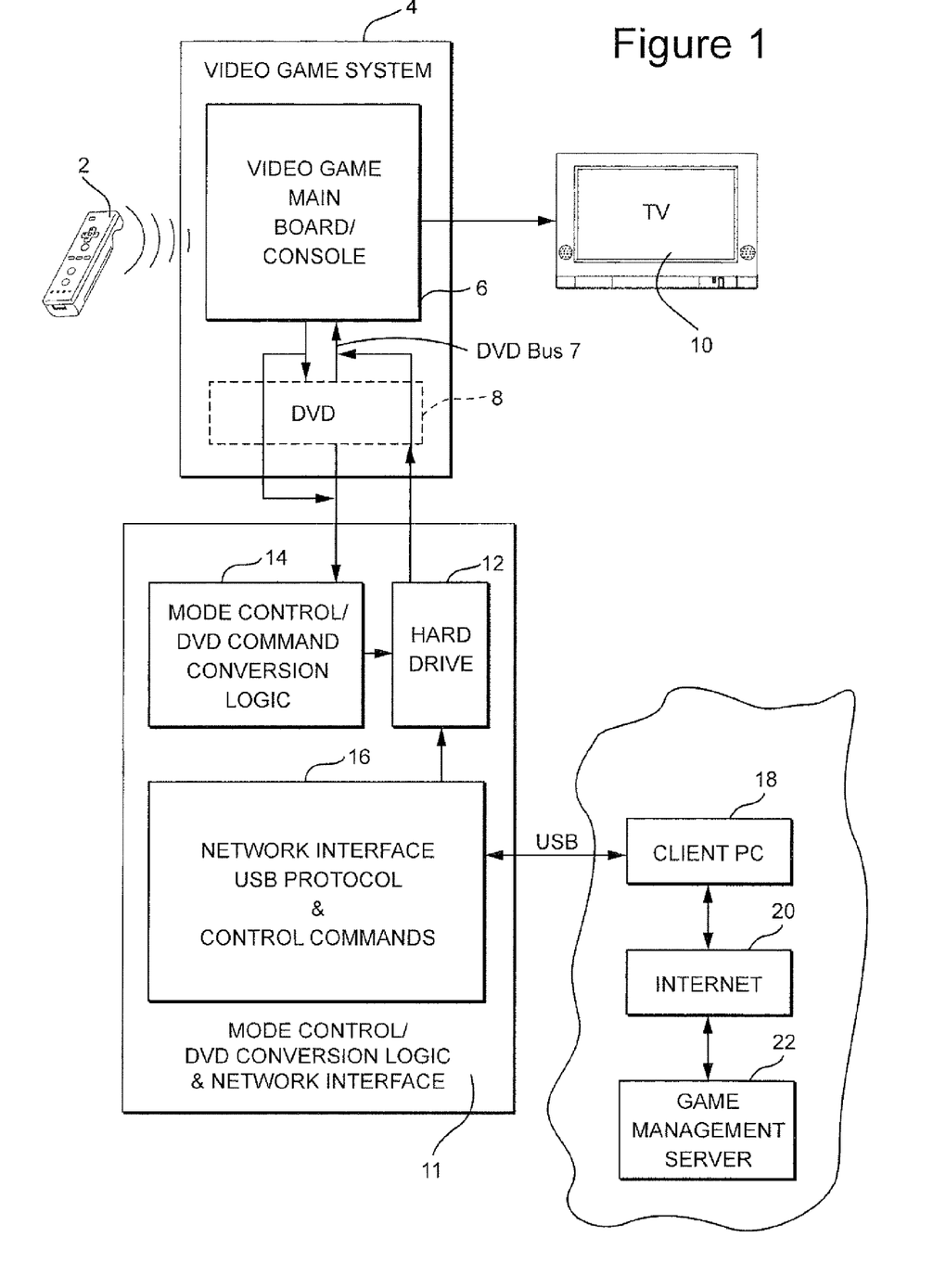
FIG. 1 shows a exemplary illustrative non-limiting implementation of a video game jukebox system.

FIG. 1 is an illustrative, non-limiting multiple video game jukebox type system. A modified video game system 4 with controller 2 is shown. In the illustrative embodiment controller 2 and video game system 4 may, for example, be the Nintendo's Wii™ video game system. The Wii controller 2 and video game system 4 are described in detail U.S. in application Ser. No. 11/446,187, filed Jun. 5, 2006, which is incorporated herein by reference in its entirety. Further, the Wii controller 2 and video game system 4 are further described in application Ser. No. 11/984,543, filed on Nov. 19, 2007, which is likewise incorporated herein by reference.

In accordance with an illustrative embodiment, the Wii controller 2 is used to, for example, select games from a menu as described hereafter, and to control video game play via controller motion and various control keys as is described in the associated applications incorporated herein by reference. Controller 2 wirelessly transmits data such as game control data to video game system 4. The game control data may be generated using an operation section of controller 2 having, for example, a plurality of operation buttons, a key, a stick and the like. Controller 2 may also wirelessly receive data transmitted from video game system 4. By way of example without limitation, this data may include sound data for output via a speaker (not shown) of controller 2 or vibration control data for controlling a vibration circuit (not shown) of controller 2. Any one of various wireless protocols such as Bluetooth (registered trademark) may be used for the wireless transmissions between controller 2 and video game system 4. A "nunchuk" controller (not shown) also may be connected to controller 2. The Nunchuk controller may be held in the user's "other" hand (i.e., the hand not holding controller 2) and provides additional game control data to video game system 4.

As detailed in, for example, incorporated application Ser. No. 11/984,543, controller 2 also includes an imaging information calculation section for capturing and processing images from light-emitting devices (not shown) associated with TV 10. In one implementation, a center point between light-emitting devices is substantially aligned with a vertical center-line of the screen of television screen 10. The images from the light-emitting devices can be used to determine a direction in which controller 2 is pointing as well as a distance of controller 2 from television screen 10. By way of example without limitation, light-emitting devices may be implemented as two LED modules (hereinafter, referred to as "markers") provided in the vicinity of the screen of television 10. The markers each output infrared light and an imaging information calculation section of controller 2 detects the light output from the LED modules to determine a direction in which controller 2 is pointing and a distance of controller 2 from the display screen of television 10 as mentioned above.

As explained in copending application Ser. No. 11/984, 543, video game console 6 includes, for example, a RISC central processing unit (CPU) for executing various types of applications including (but not limited to) video game programs. The CPU executes a boot program stored in a boot ROM (not shown) to initialize video game console 6 and then executes an application (or applications) stored on hard drive 12.

As explained in copending application Ser. No. 11/984,543 the game console CPU is connected to a system LSI that includes a graphics processing unit with an associated graphics memory (not shown), audio digital signal processor (DSP) (not shown), internal main memory (not shown) and an input output (IO) processor (not shown).

The IO processor of the LSI is connected to one or more USB ports, one or more standard memory card slots (connectors), a WiFi module, flash memory, and a wireless controller module. The video game console includes, for example, USB ports that are used to connect a wide variety of external devices to video game console 6. These devices include by way of example without limitation game controllers, keyboards, storage devices such as external hard-disk drives and memory sticks, printers, digital still and video cameras and the like. The USB ports may also be used for wired and wireless network (e.g., LAN) connections.

In accordance with illustrative implementations, an imaging element is provided on a front surface of controller 2 housing. The imaging element is part of an imaging information calculation section of controller 2 that analyzes image data received from the markers associated with TV 10. The imaging information calculation section has a maximum sampling period of, for example, about 200 frames/sec., and therefore can trace and analyze even relatively fast motion of controller 207. Additional details may be found in application Ser. No. 11/532,328, filed on Sep. 15, 2006, which claims the benefit of Application No. 60/716,937, entitled "VIDEO GAME SYSTEM WITH WIRELESS MODULAR HANDHELD CONTROLLER," filed on Sep. 15, 2005; application Ser. No. 11/445,280, filed Jun. 2, 2006, which claims the benefit of Application No. 60/732,648, entitled "INFORMATION PROCESSING PROGRAM," filed on Nov. 3, 2005; and application Ser. No. 11/441,146, filed May 26, 2006 which claims the benefit of Application No. 60/732,649, entitled "INFORMATION PROCESSING SYSTEM AND PROGRAM THEREFOR," filed on Nov. 3, 2005. The entire contents of each of these applications are expressly incorporated herein.

The controller 2 also includes a three-axis, linear acceleration sensor that detects linear acceleration in three directions, i.e., the up/down direction (e.g., Z-axis direction), the left/right direction (e.g., X-axis direction), and the forward/backward direction (e.g., Y-axis direction). Alternatively, a two-axis linear accelerometer or a one-axis linear accelerometer may be used. Generally speaking, the accelerometer arrangement (e.g., three-axis or two-axis or one-axis) will depend on the type of control signals desired. As a non-limiting example, the three-axis or two-axis linear accelerometer may be of the type available from Analog Devices, Inc. or SiMicroelectronics N.V. Preferably, the acceleration sensor is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may he used to provide three-axis or two-axis linear acceleration sensor.

As explained in copending application Ser. No. 11/984, 543, by detecting static linear acceleration (i.e., gravity), the linear acceleration output of the acceleration sensor can be used to determine tilt of the object relative to the gravity vector by correlating tilt angles with detected linear acceleration. In this way, the acceleration sensor can be used in combination with a micro-computer of controller 2 (or another processor) to determine tilt, attitude or position of controller 2. Similarly, various movements and/or positions of controller 2 can be calculated through processing of the linear acceleration signals generated by the acceleration sensor when controller 2 containing the acceleration sensor is subjected to dynamic accelerations by, for example, the hand of a user.

In the conventional Nintendo Wii home-based video game system, video game console circuitry 6 is designed to operate in conjunction with a DVD drive 8, which is shown in dashed lines for purposes of illustration only. In a preferred illustrative implementation, DVD 8 is removed from the video game system. However, in the illustrative implementation, the bi-directional DVD bus 7 is utilized for communicating with a Mode Control/DVD command conversion logic and network interface 11. Thus, in the illustrative implementations, Mode Control/DVD command conversion logic and network interface 11 utilizes the bi-directional DVD bus 7 as the communication link with video game system 4.

Mode Control/DVD command conversion logic 14 permits changing/switching from one "virtual" disk to another virtual disk resident on hard drive 12 in response to DVD type commands (e.g., DVD read/seek commands) that are accessed from hard drive 12 by video game system 4 processing circuitry and coupled to mode control/DVD command conversion logic 14 via DVD bus 7, when the video game system 4 is powered up and a menu generating program is accessed. The menu generating program is stored as a "virtual" disk on hard drive 12.

The menu generating program initially operates to determine what other virtual disks are resident on hard drive 12. Thus, the menu generating program is initially operable to access a directory virtual disk in response to DVD command-type signals on DVD bus 7. The directory disk contains information identifying the further virtual disks on hard drive 12.

The Mode Control/DVD conversion logic 14 also enables accessing of associated game preview graphics data for each of the associated games. In an illustrative implementation, the game preview graphics may be in the form of artwork that may be rendered to display a series of game packages such as is, for example, illustrated in FIG. 2.

Figure 2:
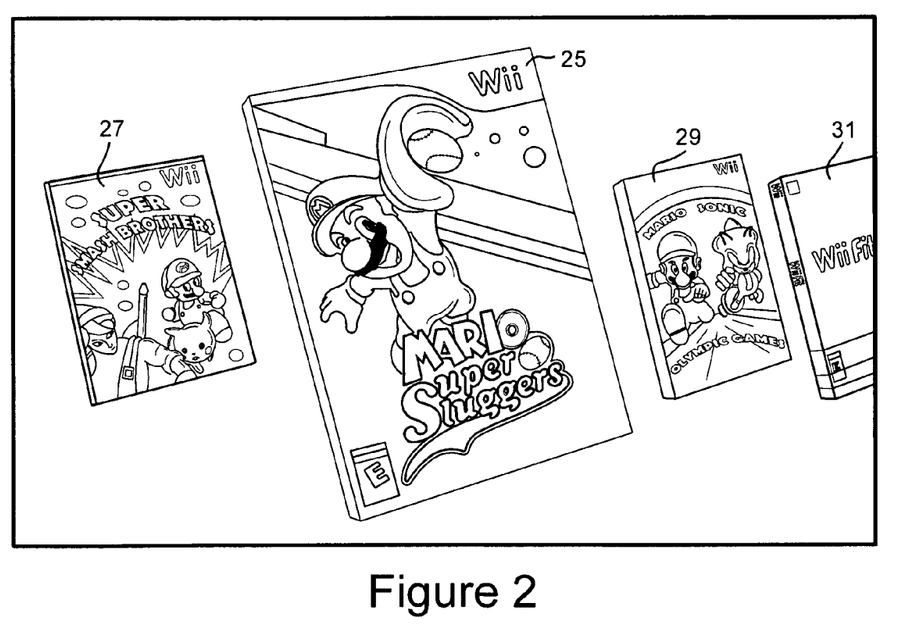
FIG. 2 shows an exemplary illustrative non-limiting game selection menu.

FIG. 2 shows an illustrative menu that includes rendered artwork associated with each game resulting in the generation of representations of video game packaging. For example, the illustrative menu display screen shown in FIG. 2 depicts a Mario Super Sluggers package 25, a Super Smash Bros. video game package 27, an Olympic games package 29 and a Wii Fit package 31. Other data may be shown on the menu screen such as game rating data. Further, in other illustrative embodiments, animations may be generated for a user to see illustrative game sequences. Thus, it should be recognized that a wide range of alternative portrayals or previews of video games may be generated in accordance with other illustrative embodiments. For example, a brief video clip may be generated showing video game play. Further, a textual description of the video game together with player reviews could be displayed, etc.

The menu screen permits a user to scroll either left or right to generate representations of each of the, for example, twenty games stored in virtual disks in hard drive 12 partitions. If a user selects Mario Super Sluggers by depressing an appropriate control key on controller 2, Mario Super Sluggers game play is initiated.

In accordance with an illustrative embodiment, preview data is embedded in the virtual disk 12 partition that includes the game software to be executed by the video game system 4. By embedding the preview data with the associated video game, data management tasks are advantageously simplified. In an illustrative implementation, also associated with each video game, in addition to the video game artwork for generating, for example, the packaging display, is a video game rating that is displayed for the user so that a judgment can be made as to whether the video game is appropriate for the user to play. Such a rating may, for example, be displayed immediately after a game is selected or may be displayed, if desired, on the initial menu screen.

Hard drive 12 may be any of a variety of conventionally available hard drives, but should have enough capacity to store the desired number of games together with the preview data/artwork and other game related data. For example, a capacity of at least a 100 gigabytes is desirable.

Mode Control/DVD command conversion logic and network interface 11 also includes a network interface 16 including USB protocol and control commands. Network interface 16 permits new games to be loaded onto hard drive 12 via, for example, a USB interface. For example, a client PC 18 may communicate with the hard drive 12 to enable or disable games from being accessed from the hard drive 12. The client PC 18 may be used to remove existing games from hard drive 12 or add new games.

Such game management may, if desired, take place via the client PC 18 alone, or may take place via the internet 20 through a game management server 22. Game management server 22 may be used to manage the games that are stored on hard drive 12 and includes an associated data base that, for example, includes a wide ranging library of available video games for transmission to the hard drive via internet 20 to client PC 18. In this fashion, game management server 22 can manage the distribution of games that are being distributed to, for example, hospitals or hotels.

Thus, in accordance with an illustrative embodiment, the game playing media. e.g., the DVD disk drive 8, of a conventional home-based video game system, such as Nintendo's Wii™ video game system, is replaced with an alternative media serving device (for example, a hard drive 12 coupled with associated special purpose logic 14) in order to convert an existing video game system into a jukebox (adding the ability to play 1 of 20+ games as if it was running off of a single DVD disk). The modified multiple game jukebox system including the hard drive is thus able to execute video game software designed for execution on the Wii home-based system and designed to be resident on a single DVD type memory media. In this implementation, the hard drive includes multiple partitions, each of which represents a Wii video game DVD disk. In this illustrative implementation, in communicating with such a hard disk drive device using the existing DVD bus 7, a particular pattern of disk reads or seeks is utilized to cause the hard drive to serve alternative data on subsequent disk reads (other than what exists on the currently selected disk).

In this illustrative implementation, a media serving device initially defaults to playing a disk that contains a game selection menu program. The menu permits a user to select one of multiple video games for play, while displaying the game rating to help ensure that the selected game is user appropriate. The game selection menu program dynamically determines how many games are stored on the media serving device. The game selection program generates signals via a particular pattern of disk reads or seeks causing the media serving device to then serve special directory information on the next legitimate read (instead of whatever exists on the currently selected menu disk). This directory information lists the number of games and their corresponding slots on the media serving device In addition, as explained above, the illustrative implementation generates game preview graphics for a user to recognize games for selection. For example, in one of many possible implementations, the menu may access unique bitmap art and other related information about each selectable game. This information is held within the media serving device or "disk" of each game and is not accessible through normal reads of the menu disk. The menu program asks the media serving device for this information via a particular pattern of disk reads or seeks. Then on subsequent disk reads, this information is served to the menu (instead of whatever exists on the currently selected menu disk). For example, the menu may signal via a disk seek to address 0x100000 that it needs information about the game in slot 1. Then, the menu may read from address 0x100000 and instead of getting data from the menu disk at location 0x100000, the media serving device feeds it information specific to the game in slot 1.

In an illustrative implementation, once the menu has the list of games and the information related to each game, it can present the user with a menu of the selectable games. For example, the user may then select a video game, such as Super Mario Galaxy or Wii Sports using the exemplary menu shown in FIG. 2. Once a game is selected on the menu, the menu communicates with the media serving device via a particular pattern of disk reads or seeks as to which video game disk should now be active in the disk drive from the perspective of the video game console. The menu then resets the video game system and the console boots up with the newly selected disk to play. When the device is reset again, it reverts to the menu disk and boots it again in order to repeat the process.

Figure 3:
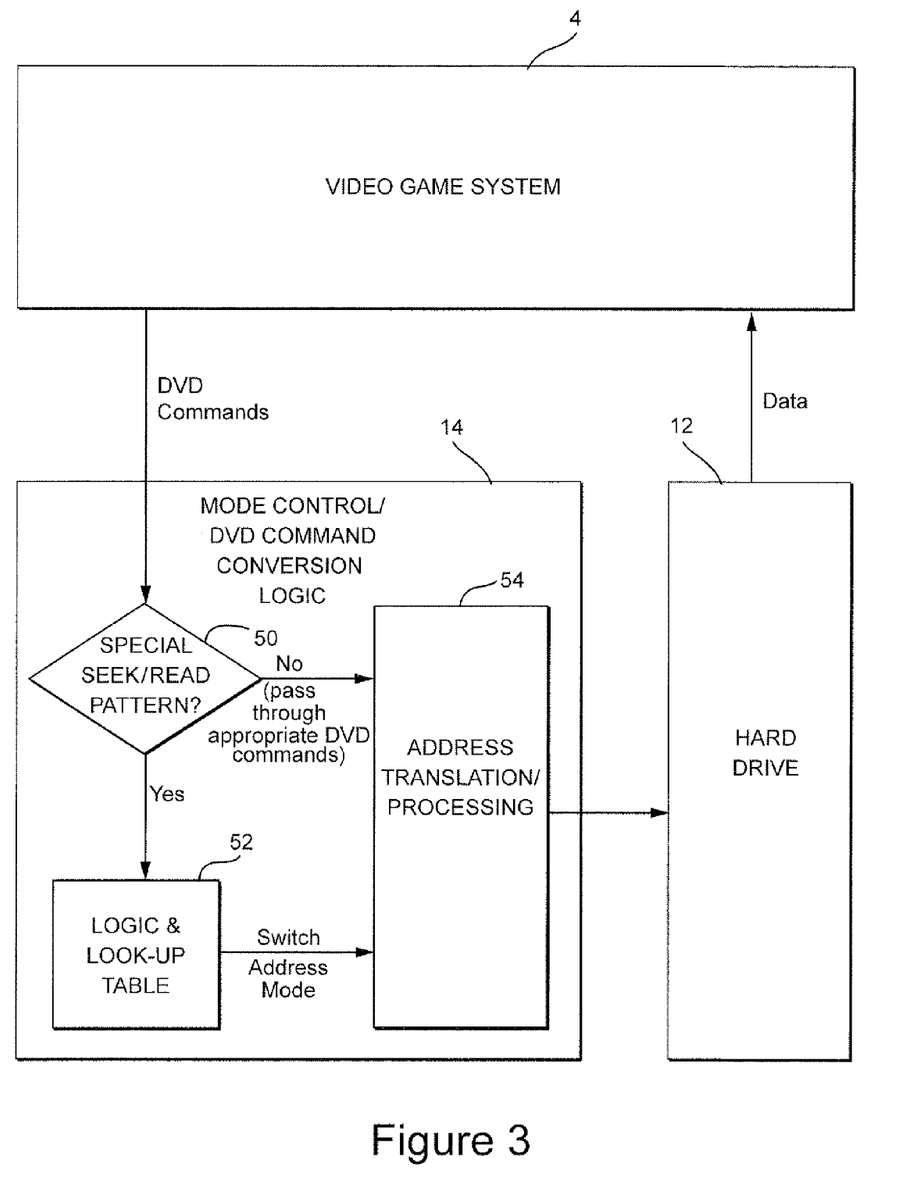
FIG. 3 shows an exemplary illustrative non-limiting block diagram showing the Mode Control/DVD command conversion logic of FIG. 1 in further detail.

FIG. 3 is an illustrative block diagram of a portion of the FIG. 1 system, showing in more detail, the interaction between the video game system 4, Mode Control/DVD command conversion logic 14 and hard drive 12. The multi-game, jukebox-type video game system shown in FIG. 1 is designed to be transparent to the video game applications that are, in the illustrative embodiment, identical to games which would run on an unmodified video game system utilizing a DVD drive 8, shown in dashed lines in FIG. 1. Thus, in this example, video games such as Mario Super Sluggers, are designed to be executed by an off the shelf Nintendo Wii video game system. Accordingly, such games transfer data from the memory media and execute oil the video game system 4 in a corresponding fashion to what would occur in an off the shelf Wii video game system.

Thus, the video game programs described in this example, utilize DVD-related commands, such as DVD open, DVD read, and expect to receive appropriate data from an identified location/file. The video game program instructions, upon being executed, will progress to a DVD-related command, such as a DVD seek or read command and will be passed to Mode Control/DVD command conversion logic 14.

As indicated at block 50, mode control/DVD command conversion logic 14 checks to determine whether the DVD command is a special DVD seek or read pattern. The check at block 50 determines whether the command is a regular read instruction, in which a game is executing, or is a special command that is in the form of seek or read bit patterns that a game is unlikely to ever perform. If the command is a regular read instruction of the type a game executes, the command is simply passed to address translation/processing logic 54 and used to access the appropriate location on hard drive 12 in accordance with the associated address, for example, indicated by the regular read instruction. However, if a special seek or read pattern is detected, further special mode switching-related processing occurs in logic and look-up table 52.

In an illustrative implementation, the jukebox menu generating program generates such special seek or read patterns. When the menu generating program boots up, the program accesses a directory to obtain special directory information.

The special seek or read pattern, if detected at block 50, is coupled to logic and look-up table 52 and triggers switching the address mode. In practical effect, such address switching typically results in changing the "virtual" disk that is accessed from the hard drive. For example such address switching may result in switching from the virtual disk partition containing the menu generation program to, for example, the virtual disk containing the game program directory to access this special directory during the next legitimate read operation. Such switching of virtual disks, for example, may result in the entry into a packaging art mode, a rating graphics mode, a game playing or other mode.

Address translation logic 54, in response to a switch address mode signal received from logic and look-up table 52 modifies the next read operation such that the accessed address will be from the appropriate virtual disk on hard drive 12.

Logic and look-up table 52 includes a look-up table and associated logic that operates in accordance with the following illustrative description. In an illustrative implementation, hard drive 12 embodies various partitions including twenty virtual disk partitions corresponding to twenty DVD's, where each virtual disk partition contains a video game program, associated artwork and other data. In an illustrative embodiment, a first virtual disk partition stores a video game menu generating program, a second virtual disk partition stores special directory information, and a third virtual disk partition stores the first video game program and related information. Partitions 4 through N contain the remaining game program-related instructions and other data.

When the menu generating program sends a special seek or read pattern that is detected at block 50, such a pattern is decoded by logic and look-lip table 52. Thus, a lookup table may contain a column of patterns corresponding to particular special seek patterns and a corresponding column of address pointers to a particular virtual disk/particular locations on said virtual disk.

In this fashion, for example, a particular pattern would have an entry corresponding to the directory virtual disk to enable the subsequent accessing of the special directory. The address mode is then switched such that the directory virtual disk becomes active. Thus, in this illustration, the active disk becomes virtual disk 2. Accordingly, at the next read operation, address translation/processing logic 54 operates on the address to be read and includes, for example, an offset that ensures that virtual disk 2 is accessed.

Thus, by utilizing the instruction address plus an appropriate offset, a memory address is generated by address translation logic 54 to ensure that the appropriate virtual disk location is accessed from hard drive 12 and the appropriate data/instructions are coupled to video game system 4 for appropriate processing.

If the accessed data was directory data, then data is provided to video game system 4, such that it receives an indication of how many games are actually resident on hard drive 12 and which virtual disk numbers are associated with each of the virtual disks, included in the directory, thereby identifying the location of game programs such as Mario Super Sluggers, Wii Fit, etc. With such information, the video game system 4 is then enabled to, for example, access the graphics for generating the box packaging for Mario Super Sluggers 25 or the like as shown if FIG. 2. Alternatively, the received data may identify which video game should be accessed next for game play.

Thus, by virtue of the mode control/DVD command conversion logic 14, the video game system is enabled to appropriately enter the next processing mode and access the active virtual disk.

Figure 4A:
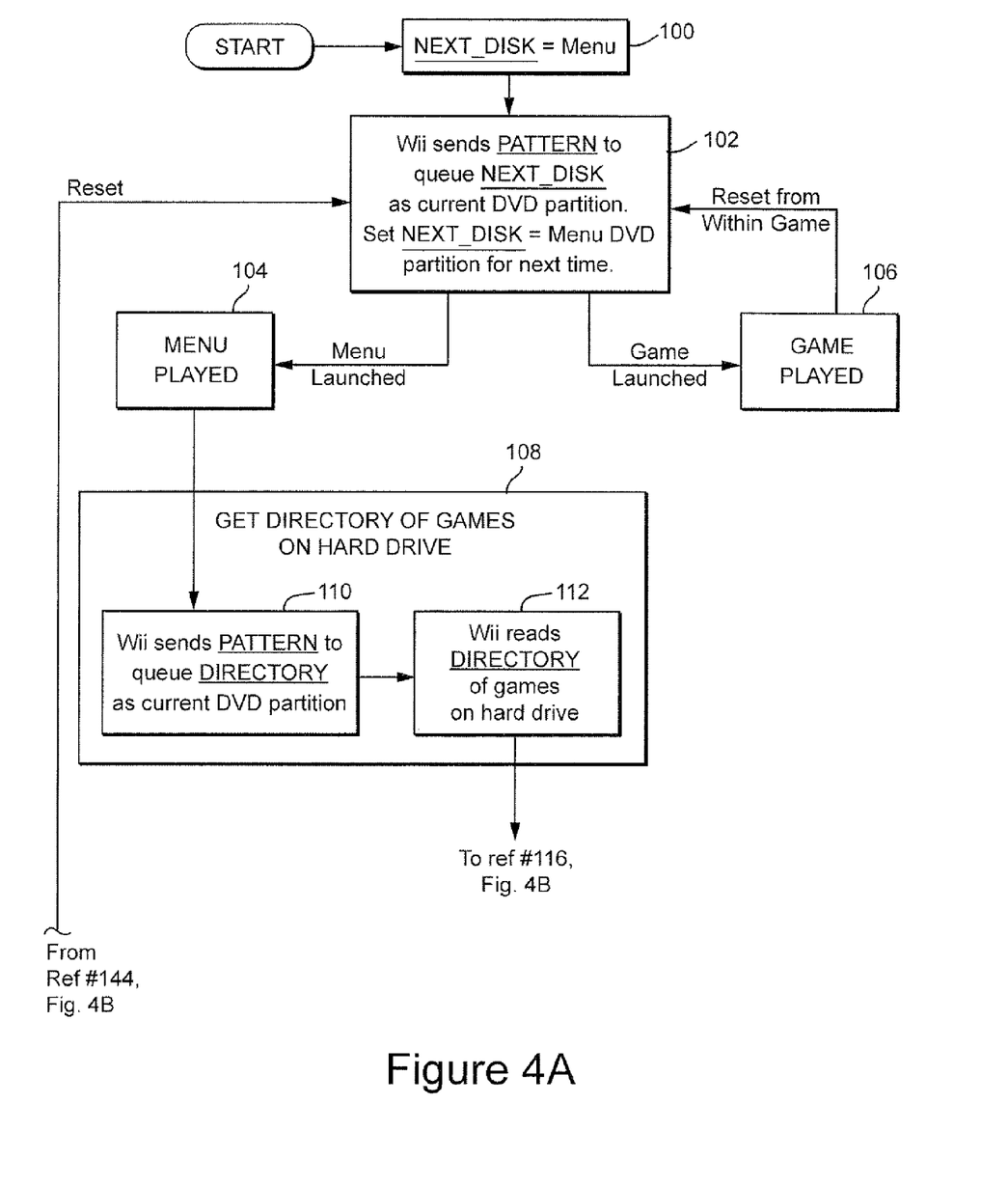
FIGS. 4A and 4B shows an exemplary illustrative non-limiting flowchart depicting an illustrative manner of operating the video game jukebox system of FIG. 1.
Figure 4B:
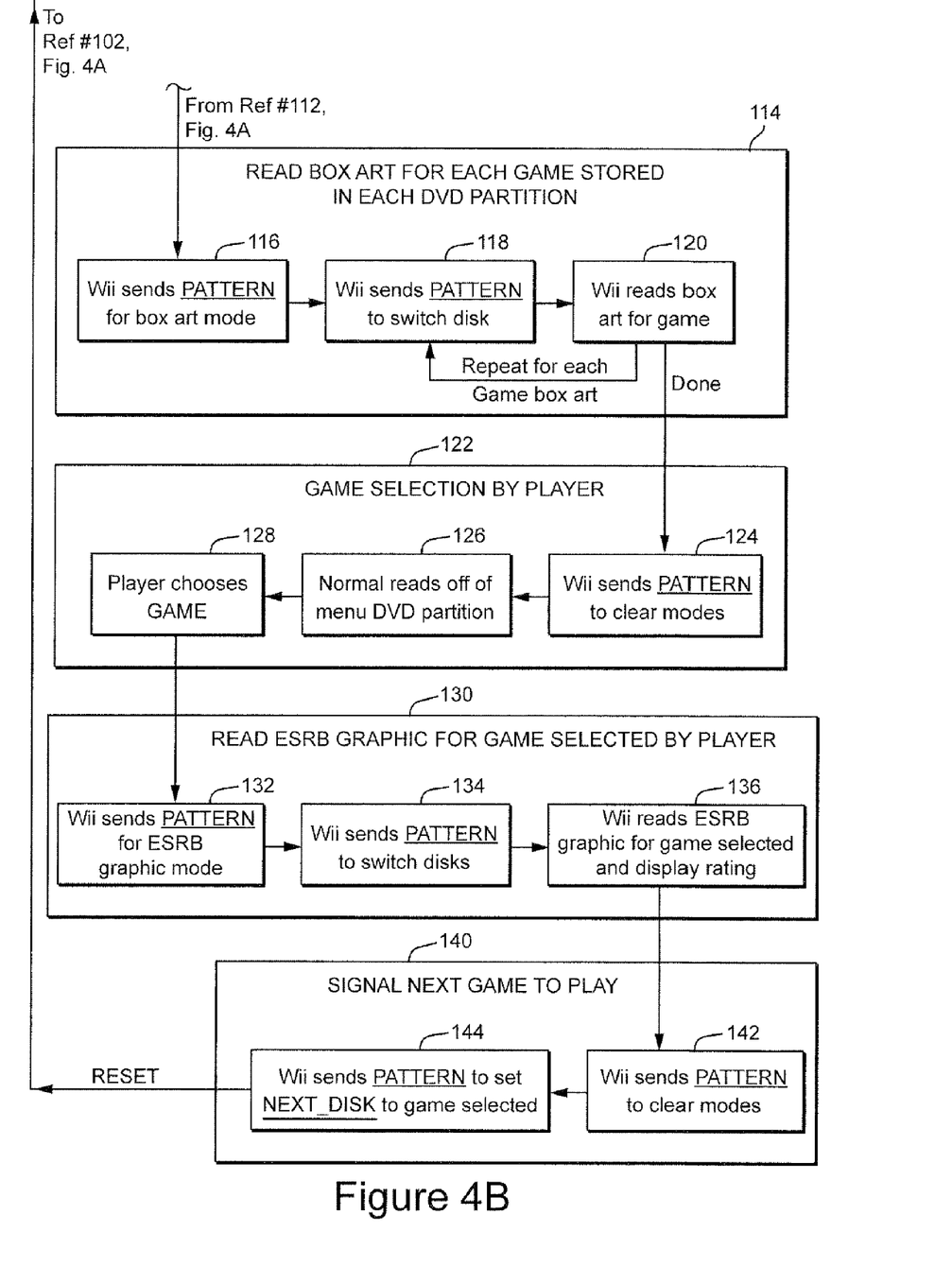

FIGS. 4A and 4B delineate an illustrative sequence of operations of the multi-game jukebox system shown in FIG. 1. As shown at block 100, a variable "next_disk" is set that establishes the hard drive location that it is pointed to for accessing. Once power is turned on during boot-up, the variable next_disk is set to equal menu to establish the menu generating program virtual disk as being the active disk.

Thereafter, as indicated at block 102, an embedded program is executed that causes the video game system to send a pattern to queue the "next_disk" as the current active DVD partition. Thus, in an illustrative implementation, when the Wii video game system powers up, it generates, for example, a number of DVD seek commands that identify unique addresses that would never be utilized by any video game. For example, these special patterns may be read commands or seek commands that are not typically utilized by a video game. The special pattern is interpreted by the illustrative implementation so as to initiate activity by the appropriate virtual disk. The system then sets the "NEXT_DISK" variable such that menu DVD partition is accessed immediately thereafter. When the program returns to block 102 during the next pass, the next_disk variable is set to menu.

Since the current virtual disk is now "menu," the menu generating program is then launched at block 104. The menu generating program executing at 104 must access the appropriate graphics for generating, for example, the game program selection menu shown in FIG. 2. The first task to be completed is get a directory of games that is embodied on hard drive 12 (108). This accomplished by the Will system sending a pattern that is decoded by mode control logic 14 to result in queueing the "directory" virtual disk as the current DVD partition (110).

The particular pattern sent by the Wii video game system triggers the FIG. 3 table look-up logic to select the address mode resulting in the directory virtual disk as being the next active disk. Thus, while the program menu generating virtual disk is the current active disk, a detected pattern triggers the directory to become the next virtual disk. A read command is then issued which causes the Wii to read the directory of games on hard drive (112). In this fashion, the Wii system receives a directory of games that are stored on the hard drive.

As shown in FIG. 4B, the Wii video game system, now informed of the games that are on the hard drive, enters a box/package art mode and accesses, in the illustrative embodiment, graphics for generating the package illustrations for each game stored in each DVD partition, to thereby result in the package generation menu shown in FIG. 2 at 25, 27, 29 and 31 (114). The Wii video game system sends a special pattern to trigger the system to entering box art mode in which the graphics for generating the packaging is accessed (116). In box art mode, the system is aware, via, for example, information in the directory, that the graphics in the illustrative implementation is stored at the end of each virtual disk, after the game program information. In an illustrative embodiment, the box art for the first game is stored in virtual disk number 3 at, for example, a location that follows the game program software and may be offset from the start of the program by, for example, 4.7 gigabytes.

The Wii video game system 4 sends a special pattern to switch the virtual disk to thereby result in accessing the appropriate box packaging graphics for the first game (118). Thereafter, the Wii system reads the box art for the identified game (120). This operation is repeated until the box packaging art for each game embodied on the hard drive 12 has been accessed.

After all the box art has been accessed, the game selection mode is initiated (122). Initially, the Wii video game system 4 sends a unique pattern to clear the present box art mode (124) to thereby initiate the menu virtual DVD partition as the active virtual disk (126). Having cleared the modes, normal reads oft of the menu DVD partition are performed without the address translations resulting from switching from one virtual disk to another. In this fashion, the menu generating program accesses the appropriate address and, if desired, associated audio/music to set the stage for the player choosing a game for game play. At this point in the menu program generating execution, a display, such as shown in FIG. 2, is generated.

The system then detects a player choosing a particular game to play (128). The player makes a game selection through depressing an appropriate control key on the Wii controller 2, shown in FIG. 1.

Prior to playing the game, a game rating display mode is entered and a rating is graphically displayed for the game selected by the player (130). Initially, the Wii sends a special pattern for initiating the rating display graphics mode (ESRB graphic mode) (132). The Entertainment Software Rating Board (ESRB) ratings are designed to provide concise and impartial information about the content of a video game. Ratings may include "M" for mature, "T" for teen, etc. Additionally, for example, a text display may indicate the presence of mild violence in the game. In order to access such rating information, the Wii video game system sends a pattern to switch disks to access the virtual disk associated with the game selected by the player (134). The system 4 then reads the ESRB graphic for the game selected and displays the rating information that is stored at a particular location on the virtual disk reserved for such information (136).

At this point, the system launches into a game playing mode where the selected game is executed (140). The Wii system 4 sends a further pattern to clear presently existing modes (142) to thereby eliminate the ESRB mode as being the active mode (142). The Wii system 4 sends a further pattern to set the "next_disk" variable to the game selected (144).

The video game system is then reset so that the next_disk variable becomes, for example, game 5, which may correspond to the Mario Super Sluggers game 25 shown in FIG. 2. The reset signal triggers the hardware to be reset, which initiates at block 102 of the game being launched, and then game play commences (106). Thus, at block 102, a pattern to sent that queues the next_disk as the current DVD partition, which in this case correspond to Mario Super Sluggers e.g., game 5.

Thereafter, the next_disk variable is once again set to the menu DVD for entry after game play and game play is initiated (106).

Once the game software is executed, the game executes as it would if stored on a single DVD in an off the shelf video game system. If a player resets the game, the routine branches back to 102 for queuing up whatever was set as the next disk, which will result in the menu virtual disk being displayed.

In this fashion, the system alternates from being in a game playing mode to a menu mode for a further game selection.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

The invention claimed is:

1. A video game system for executing any one of a plurality of selectable video game programs, said video game programs including commands for accessing a first type memory media comprising:
   a second type memory media for storing a plurality of video game programs;
   video game processing circuitry for accessing a user selected video game program and for executing the selected video game program, said video game processing circuitry outputting commands of the type associated with said first type memory media; and
   mode control logic operatively coupled to said video game processing circuitry for detecting at least certain of said commands associated with said first memory type received from said video game processing circuitry, said mode control logic in response to at least one of said commands associated with said first type memory media, for processing said at least one of said commands to enable accessing information on said second type memory media and to enable at least one video game-related processing mode.

2. The video game system according to claim 1, wherein said first type memory media is a DVD disk.

3. The video game system according to claim 1, wherein said second type memory media is a hard drive.

4. The video game system according to claim 1, wherein said at least one video game-related mode is a game selection menu generation mode.

5. The video game system according to claim 1, wherein said at least one video game-related mode is a game graphics accessing mode to access graphics data from said second type memory media indicative of a plurality of selectable video games.

6. The video game system according to claim 1, wherein said at least one video game-related mode is a game rating display generation mode.

7. The video game system according to claim 1, wherein said second type memory media includes a plurality of partitions including a partition for storing at least one game selection menu generating program and a plurality of partitions for storing a plurality of video game programs.

8. The video game system according to claim 1, wherein said mode control logic includes logic for detecting at least one predetermined bit pattern and address switching logic for changing the addressing mode in response to the detection of at least one predetermined bit pattern.

9. The video game system according to claim 1, wherein said commands of the type associated with said first type memory media are DVD disk read or seek commands.

10. A video game system for playing any one of a plurality of selectable video games for executing video games including instructions for accessing a first type memory media comprising:
    a second type memory media for storing a game program selection menu generating program and for storing a plurality of video game programs;
    video game processing circuitry for outputting commands of the type associated with said first type memory media;
    conversion logic for receiving said commands of the type associated with said first memory type from said video game processing circuitry and generating in response to at least one of said commands, address information for accessing locations on said second type memory media for accessing said game program selection menu generating program, said video game processing circuitry being operable to execute said game program selection menu generating program.

11. The video game system according to claim 10, wherein said conversion logic generates in response to one of said commands, address information for accessing locations on said second type memory media for accessing a directory of games stored on said second type memory.

12. The video game system according to claim 10, wherein said first type memory media is a DVD disk.

13. The video game system according to claim 10, wherein said second type memory media is a hard drive.

14. The video game system according to claim 10, wherein said commands of the type associated with said first type memory media are DVD disk read or seek commands.

15. A method of operating a video game system for playing any one of a plurality of selectable video games for executing video games including instructions for accessing a first type memory media, said video game system including video game processing circuitry, said method comprising:
    storing a plurality of video game programs on a second type of memory media;
    outputting commands of the type associated with said first type memory media by said video game processing circuitry; and
    detecting at least one of said commands of the type associated with said first type memory media having a predetermined bit pattern;
    processing said at least one of said commands to enable accessing information on said second type memory media and to enable at least one video game-related processing mode;
    accessing said second type memory media in response to said processing; and
    controlling the video game system processing mode in response to the information accessed from said second type memory media.

16. The method according to claim 15, wherein said first type memory media is a DVD disk.

17. The method according to claim 15, wherein said second type memory media is a hard drive.

18. The method according to claim 15, wherein said at least one video game-related processing mode is a game selection menu generation mode.

19. The method according to claim 15, wherein said at least one video game-related mode is a game graphics accessing mode to access graphics data from said second type memory media indicative of a plurality of selectable video games.

20. The method according to claim 15, wherein said at least one video game-related mode is a game rating display generation mode.

21. The method according to claim 15, further comprising:
storing at least one game selection menu generating program in a first partition on said second type memory media; and
storing a plurality of video game programs in a corresponding plurality of partitions on said second type memory media.

22. The method according to claim 15, further comprising:
detecting at least one predetermined bit pattern; and
changing the addressing mode in response to the detection of said at least one predetermined bit pattern.

23. The method according to claim 15, wherein said commands of the type associated with said first type memory media are DVD disk read or seek commands.

24. The video game system according to claim 1, wherein the mode control logic circuitry accesses information on said second type memory media in the same manner as it accesses data on said first type memory media.

25. The video game system according to claim 10, wherein the conversion logic accesses information on said second type memory media in the same manner as it accesses data on said first type memory media.

26. The method according to claim 15, wherein information on said second type memory media is accessed in the same manner as it accesses data on said first type memory media.

* * * * *